UNITED STATES PATENT OFFICE.

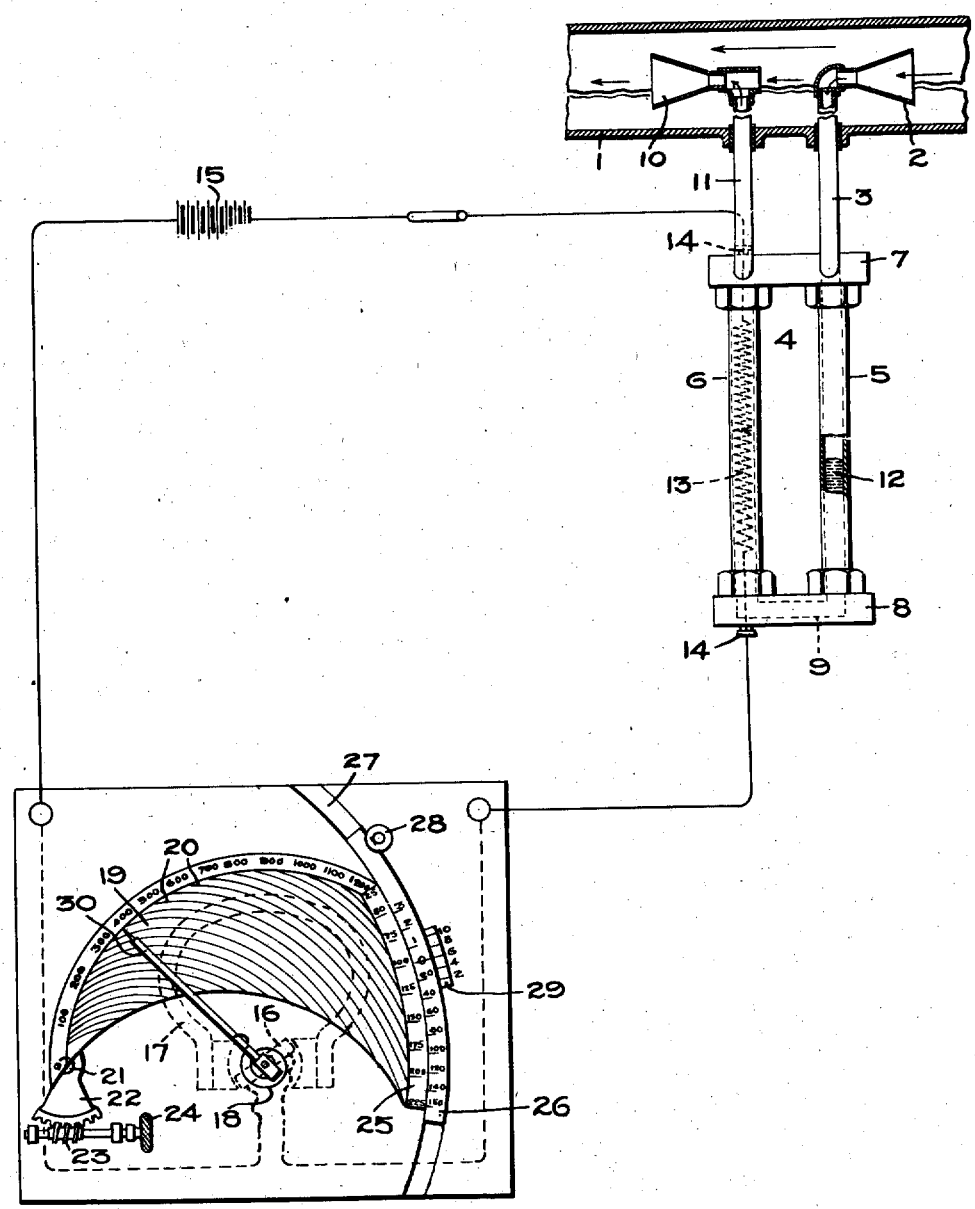

AUSTIN R. DODGE, OF SCHENECTADY, NEW YORK, ASSIGNOR TO GENERAL ELECTRIC COMPANY, A CORPORATION OF NEW YORK.

METER FOR MEASURING ELASTIC FLUIDS.

1,056,513. Specification of Letters Patent. Patented Mar. 18, 1913.

Application filed February 12, 1910. Serial No. 543,590.

*To all whom it may concern:*

Be it known that I, AUSTIN R. DODGE, a citizen of the United States, residing at Schenectady, in the county of Schenectady, State of New York, have invented certain new and useful Improvements in Meters for Measuring Elastic Fluids, of which the following is a specification.

The present invention relates to meters for measuring elastic fluids, and especially for measuring the rate of flow of steam or air through a pipe or main.

The object of my invention is to provide a meter which is simple in construction and reliable in operation.

A further object of my invention is to provide a meter wherein the device which directly indicates the rate of flow can be situated at any desired distance from the main or pipe whose flow is being metered, while the part that is acted upon by the fluid is located partly within the pipe and partly outside. Such an arrangement has the advantage that said device can be located on the switchboard of a power station, or in the office of the station, or wherever it is desirable. This also permits of the portion of the meter that is connected to the pipe being located at the most desirable point with respect to the source of supply, which point is frequently inaccessible.

In the accompanying drawing, which is illustrative of one of the embodiments of my invention, is shown my improved meter in a more or less diagrammatic manner for the sake of simplicity.

1 indicates the main or pipe through which the fluid to be metered flows. The size of this pipe will depend upon the volume of fluid that is to be conveyed. Located within or forming a part of the pipe is an agent for causing a pressure difference dependent upon the rate of flow, in this case a Pitot tube comprising in the present illustration of my invention a funnel 2, whose large end faces the moving column of fluid to be metered, and may for convenience be termed the high-pressure portion of the Pitot tube. This funnel is connected by a pipe 3 with one side of a U-shaped tube 4, so that whatever pressure exists due to the action of the funnel is conveyed to the mercury column in the U-tube. The U-tube comprises two hollow legs 5 and 6, which are supported top and bottom by heads 7 and 8. The lower head 8 is provided with a passage 9 for connecting the two legs of the tube. The other portion of the Pitot tube comprises, in the present illustration, a funnel 10 that may be open at both ends. This funnel faces in the opposite direction from the funnel 2, and for convenience may be termed the low-pressure portion of the Pitot tube. It is connected by the pipe 11 with the leg 6 of the U-tube. I have shown the funnels relatively large for the sake of clearness of illustration. In actual practice they are made much smaller, so as to offer the minimum amount of opposition to flow of the fluid.

If the temperature and pressure of the fluid to be metered are constant, the amount of fluid flowing in the pipe 1 will be proportional to the velocity. The fluid acting on the funnel 2 creates a pressure that is due to the velocity head, while the pressure due to the funnel 10 is equal to the static pressure in the pipe minus a pressure due to the velocity head. As a result of this the body of mercury or other heavy fluid 12 in the U-tube will be forced to a greater or less extent from the leg 5 into the leg 6. The amount of fluid in the U-tube thus transferred will depend upon the pressure difference created by the agent. The legs 5 and 6 may with advantage be made of some material which is a non-conductor of electricity, or is insulated and is also strong enough to withstand the pressure of the fluid in the pipe 1. The present meter is intended for high-pressure service, although by suitable modification of the scales it can be adapted for low pressures.

In order to communicate the movements of the mercury to a device capable of showing the rate of flow of fluid in the pipe 1, a resistance unit 13 is located in one of the legs of the U-tube 4 and is immersed to a greater or less extent in the mercury or other heavy fluid capable of conducting electricity. The unit may be made in a variety of ways so long as its resistance will be changed by the movements of the body of mercury or other heavy fluid. Care should be taken to see that the material is of such a character and has such a surface finish that the mercury or other fluid in the tube will not cling to it when the level is lowered. If it does cling it may interfere with the accuracy of the readings. When no fluid is flowing in the pipe 1 the heights of the columns of mercury in the U-tube are equal, but when there is a flow, the heights of said columns will be unequal and the difference will be determined by the pressure difference created by the agent. A change in height of the mercury column in leg 6 will change the resistance by cutting more or less of the resistance unit into or out of circuit. The ends of the unit pass through suitable insulators 14 that also serve to prevent the escape of fluid from the U-tube. In circuit with the unit is a means for furnishing electricity thereto at a constant or substantially constant voltage. It may be a battery 15, the exciting circuit of the power station in which the meter is located, or other source of power, as desired.

Connected to the battery and to the lower end of the resistance unit is a means sensitive to changes in current flow for indicating the extent of such changes, and coöperating with said means is a scale or chart suitably calibrated so that the rate of flow of the fluid in the pipe 1 per unit of time can be read directly, as in pounds flow per hour, for example. In the present illustration said means comprises a coil 16 mounted on a spindle for oscillating movement, and through which current from the source 15 flows, the amount of flow being determined by the resistance in circuit, while the amount of resistance in circuit is determined by the deflection of the mercury from one leg to the other of the U-tube. The coil 16 is located between the pole pieces of a permanent or electromagnet 17. Acting in opposition to the movements of the coil are means, such as one or more springs 18 located one below the other that may also be used to carry current to the coil. It will be observed that the coil 16 and the magnet form an electric motor for moving the needle or pointer over the scale or dial of the meter. I have shown an exceedingly simple motor for this purpose, but do not wish to be understood as limiting myself to the specific form of motor shown.

Suitably mounted on the casing inclosing the magnet is a scale or dial 19 having flow lines 20 marked thereon which are usually obtained by calibrating, at least in the first instance, i. e., causing known amounts of fluid at a given pressure to flow through the pipe 1 and noting the deflections, then changing the pressure and again noting the deflections, and so on.

The amount of fluid flowing through a main at constant velocity changes with changes in pressure, increasing with an increase in pressure, and vice versa. To compensate for this a pressure correction device is provided. The scale 19 is supported on a pivot 21, and below said pivot and attached to the scale is a segment of a worm-wheel 22. This meshes with a worm 23 having a hand-wheel 24, by means of which the position of the scale can be changed. On the right-hand side of the scale 19, and movable therewith, is a scale 25 calibrated in terms of pressure. Adjacent thereto is a scale 26 that is normally fixed in position, but can be moved circumferentially by hand, which is calibrated in terms of temperature. This scale is movable in a curved slot 27, and is normally clamped by the screw 28. The figures 1, 2 and 3 above the "zero" indicate percentages of moisture. Outside of the scale 26 is a fixed scale 29 calibrated in terms of pipe diameter, and used when the meter is charged from one pipe to another having a different diameter. Assuming the pipe 1 to be of six inches diameter, the superheat zero, and the pressure 100 pounds per square inch either by gage or absolute, depending upon the calibration, the various scales will be arranged as shown. If the pipe diameter is increased, the temperature remaining the same, the zero on scale 26 will be adjusted to register with the figure indicating the diameter. If the temperature only is changed, temperature scale 26 remains undisturbed but pressure scale 25 is moved to coincide with the new temperature on scale 26. If the pressure is changed, scale 25 is moved to bring the new pressure opposite the temperature on scale 26. The net result of the foregoing actions is to shift the flow lines to such positions that they will when compared with the pointer or needle 30 moving with the coil 16 give a true indication of the rate of flow of steam or air in the pipe 1 for a given unit of time. After the scales are once set, they ordinarily will not be changed, for under usual operating conditions the pressure and temperature of the fluid to be metered are kept as nearly constant as possible. The pressure in the pipe will ordinarily be determined by a suitable gage, such as the ordinary steam gage, and the temperature or superheat by a suitable thermometer, or equivalent device. The diameter of the pipe will, of course, be obtained by measuring it. For different ranges of pressure, temperature and pipe diameter I may use other, but similar scales, suitably calibrated.

Assuming that the mercury is forced downward in leg 5, as shown, by reason of the pressure due to funnel 2 and up in leg 6, more of the resistance unit will be short-circuited or cut out, with the result that more current will flow in the coil 16. Under these conditions the coil turns on its pivot between the field poles of the magnet and swings the pointer to the right where the flow lines indicate greater rates of flow. The intersection of the pointer with a flow line, or its position with respect to such a line will indicate at once the flow in the pipe 1. Conversely, if the flow decreases the mercury will flow from leg 6 into leg 5 of the U-tube, the resistance will be increased, and hence the springs 18 will swing the pointer toward a position of lower reading.

The indicating portion of my improved meter can be located wherever it is most desirable. It can be closely associated with the U- and Pitot tubes, or remote therefrom. By reason of this feature the indicating portion, which must be relatively delicate to insure the best results, can be kept out of the boiler or engine room, and will be free from dust and dirt. Furthermore, it can be so situated that it is free from vibration of the engines and pipe lines.

I have shown and described a type of Pitot tube or agent for establishing a pressure difference in the legs of the U-tube which I have found to operate satisfactorily in practice, but it is to be understood that the invention is not limited thereto, nor to any particular form or type of agent. The principal thing is to have an agent which will establish a pressure difference on the legs of the mercury column which bears a definite relation to the rate of flow of the fluid in the pipe. It is also important to have an agent which offers the least possible resistance to flow of the fluid in the pipe.

The movements of the mercury in the U-tube are comparatively small for ordinary changes in the rate of flow of the fluid being metered. On the other hand, by arranging the electrical instrument or device as I have these small movements are greatly multiplied, so that a small change in the mercury level results in a relatively large movement of the needle or pointer. To state the matter in another way, I have interposed between the mercury column and the indicating device a motion-multiplying means.

In accordance with the provisions of the patent statutes, I have described the principle of operation of my invention, together with the apparatus which I now consider to represent the best embodiment thereof; but I desire to have it understood that the embodiment shown is only illustrative and that the invention can be carried out by other means.

What I claim as new and desire to secure by Letters Patent of the United States, is—

1. In a fluid meter, the combination of an agent which establishes a pressure difference whose value bears a definite relation to the rate of flow of the fluid, an electrical instrument comprising a movable element, a suitably calibrated scale, a needle moved by said element over the scale, a means for adjusting the scale with respect to the needle to compensate for a change in the operating conditions, said means including a device calibrated in terms of said changed condition, a source of current supply for said instrument, and a resistance in circuit with the instrument and said source whose effective action is determined by the pressure difference established by the agent.

2. In a fluid meter, the combination of an agent that creates a pressure difference whose value is determined by the rate of flow of the fluid being metered, an electrical instrument located at a point remote from the agent and comprising a pivoted coil and a field magnet, a needle moved by the coil, a scale provided with flow lines to indicate the rates of flow of a fluid per unit of time, a pivot for the scale that is parallel to the pivot of the coil, means for adjusting the scale about its pivot for different operating conditions, a source of current supply for the instrument, a resistance coil located in a body of conducting fluid, said fluid being acted upon by the pressure difference due to the agent, and conductors for conveying current between the source of current, the instrument and the resistance.

3. In a fluid meter, the combination of an agent that creates a pressure difference whose value is determined by the rate of flow of the fluid being metered, a U-tube connected to the agent and containing a fluid that is a conductor of electricity, a resistance located in the tube and whose effective action is controlled by the distribution of fluid in the tube, an electrical instrument, comprising a motor, a needle moved thereby, a scale over which the needle moves, means for adjusting the scale angularly to compensate for a change in the operating conditions, and a source of current supply for the instrument that is controlled by the resistance.

4. In a fluid meter, the combination of an agent that creates a pressure difference whose value is determined by the rate of flow of the fluid being metered, a mercury container connected to the agent, a resistance located in the container whose effective action depends upon the displacement of the mercury in the container by said agent, an electrical measuring instrument comprising a member that is connected electrically to the resistance, a field magnet therefor, a needle moved by the member, a scale calibrated to indicate rates of flow and over which the needle moves, a second scale calibrated in terms of pressure and coöperating with the first, a means for moving said scales with respect to the needle, an adjustable temperature scale coöperating with the pressure scale, circuit connections between the resistance and the said member, and a source of current supply included in said connections.

5. In a fluid meter, the combination of an agent located in the pipe through which the fluid to be metered flows, a pivoted indicator, means for transmitting the effects of the agent to the indicator and causing it to move about its axis, a scale having lines thereon indicating rates of flow with respect to which the indicator moves, a second scale calibrated in terms of pressure which coöperates with the first, and means for angularly adjusting the first mentioned scale.

6. In a fluid meter, the combination of an agent located in the pipe through which the fluid to be metered flows, a pivoted needle, means including a motor for transmitting the effects of the agent to the needle, a scale having curved lines thereon indicating rates of flow and coöperating with the first, a second scale calibrated in terms of pressure, and a scale calibrated in terms of temperature and with respect to which the first scale is adjustable.

7. In a fluid meter, the combination of an agent located in the pipe through which the fluid to be metered flows, an indicater, means for transmitting the effects of the agent to the indicator, a scale having lines thereon indicating rates of flow over which the indicator moves, a second scale calibrated in terms of pressure and coöperating with the first, a third scale calibrated in terms of temperature and coöperating with the first, and a scale calibrated in terms of pipe diameter whereby the indications of the indicator can be corrected for changes in pressure, temperature and pipe diameter.

8. In a fluid meter, the combination of an agent that creates a pressure difference which bears a definite relation to the rate of flow of the fluid being metered, an electrical instrument comprising a movable element, a source of current supply for the instrument, a resistance in circuit with the instrument and said source, means whereby the effective action of the resistance is determined by the pressure difference due to the action of the agent, a scale calibrated in terms of the rate of flow, a pivotal mounting for said scale, a needle that is moved over the scale by said movable element, a scale concentric with said pivotal mounting and calibrated in terms of the pressure of the fluid, said scale being movable with the first scale, a scale calibrated in terms of the temperature of the fluid which scale adjoins the pressure scale and is concentric therewith, a fixed scale that is calibrated in terms of pipe diameter and arranged adjacent to the temperature scale, said temperature scale being adjustable relatively to the pipe diameter scale, and means for adjusting the flow and pressure scales about said pivotal mounting relatively to the other scales.

9. In a fluid meter, the combination of an agent that creates a pressure difference which bears a definite relation to the rate of flow of the fluid being metered, a needle, a vertical pivot for the needle, a horizontal scale calibrated in terms of the rate of flow of the fluid, means whereby the needle is caused to move over the scale by the pressure difference due to the action of the agent, and means for adjusting the scale relatively to said pivot to compensate for changes in operating conditions.

In witness whereof, I have hereunto set my hand this tenth day of February, 1910.

AUSTIN R. DODGE.

Witnesses:
HELEN ORFORD,
BENJAMIN B. HULL.

---

Corrections in Letters Patent No. 1,056,513.

It is hereby certified that in Letters Patent No. 1,056,513, granted March 18, 1913, upon the application of Austin R. Dodge, of Schenectady, New York, for an improvement in "Meters for Measuring Elastic Fluid," errors appear in the printed specification requiring correction as follows: Page 2, line 81, for the word "charged" read *changed;* page 4, line 17 strike out the words "and coöperating with the first"; same page, line 18, after the word "pressure" insert the words *and coöperating with the first;* and that the said Letters Patent should be read with these corrections therein that the same may conform to the record of the case in the Patent Office.

Signed and sealed this 15th day of April, A. D., 1913.

[SEAL.]

C. C. BILLINGS,

*Acting Commissioner of Patents.* agent located in the pipe through which the fluid to be metered flows, a pivoted indicator, means for transmitting the effects of the agent to the indicator and causing it to move about its axis, a scale having lines thereon indicating rates of flow with respect to which the indicator moves, a second scale calibrated in terms of pressure which coöperates with the first, and means for angularly adjusting the first mentioned scale.

6. In a fluid meter, the combination of an agent located in the pipe through which the fluid to be metered flows, a pivoted needle, means including a motor for transmitting the effects of the agent to the needle, a scale having curved lines thereon indicating rates of flow and coöperating with the first, a second scale calibrated in terms of pressure, and a scale calibrated in terms of temperature and with respect to which the first scale is adjustable.

7. In a fluid meter, the combination of an agent located in the pipe through which the fluid to be metered flows, an indicater, means for transmitting the effects of the agent to the indicator, a scale having lines thereon indicating rates of flow over which the indicator moves, a second scale calibrated in terms of pressure and coöperating with the first, a third scale calibrated in terms of temperature and coöperating with the first, and a scale calibrated in terms of pipe diameter whereby the indications of the indicator can be corrected for changes in pressure, temperature and pipe diameter.

8. In a fluid meter, the combination of an agent that creates a pressure difference which bears a definite relation to the rate of flow of the fluid being metered, an electrical instrument comprising a movable element, a source of current supply for the instrument, a resistance in circuit with the instrument and said source, means whereby the effective action of the resistance is determined by the pressure difference due to the action of the agent, a scale calibrated in terms of the rate of flow, a pivotal mounting for said scale, a needle that is moved over the scale by said movable element, a scale concentric with said pivotal mounting and calibrated in terms of the pressure of the fluid, said scale being movable with the first scale, a scale calibrated in terms of the temperature of the fluid which scale adjoins the pressure scale and is concentric therewith, a fixed scale that is calibrated in terms of pipe diameter and arranged adjacent to the temperature scale, said temperature scale being adjustable relatively to the pipe diameter scale, and means for adjusting the flow and pressure scales about said pivotal mounting relatively to the other scales.

9. In a fluid meter, the combination of an agent that creates a pressure difference which bears a definite relation to the rate of flow of the fluid being metered, a needle, a vertical pivot for the needle, a horizontal scale calibrated in terms of the rate of flow of the fluid, means whereby the needle is caused to move over the scale by the pressure difference due to the action of the agent, and means for adjusting the scale relatively to said pivot to compensate for changes in operating conditions.

In witness whereof, I have hereunto set my hand this tenth day of February, 1910.

AUSTIN R. DODGE.

Witnesses:
HELEN ORFORD,
BENJAMIN B. HULL.

---

It is hereby certified that in Letters Patent No. 1,056,513, granted March 18, 1913, upon the application of Austin R. Dodge, of Schenectady, New York, for an improvement in "Meters for Measuring Elastic Fluid," errors appear in the printed specification requiring correction as follows: Page 2, line 81, for the word "charged" read *changed;* page 4, line 17 strike out the words "and coöperating with the first"; same page, line 18, after the word "pressure" insert the words *and coöperating with the first;* and that the said Letters Patent should be read with these corrections therein that the same may conform to the record of the case in the Patent Office.

Signed and sealed this 15th day of April, A. D., 1913.

[SEAL.]

C. C. BILLINGS,

*Acting Commissioner of Patents.*

It is hereby certified that in Letters Patent No. 1,056,513, granted March 18, 1913, upon the application of Austin R. Dodge, of Schenectady, New York, for an improvement in "Meters for Measuring Elastic Fluid," errors appear in the printed specification requiring correction as follows: Page 2, line 81, for the word "charged" read *changed;* page 4, line 17 strike out the words "and coöperating with the first"; same page, line 18, after the word "pressure" insert the words *and coöperating with the first;* and that the said Letters Patent should be read with these corrections therein that the same may conform to the record of the case in the Patent Office.

Signed and sealed this 15th day of April, A. D., 1913.

[SEAL.]

C. C. BILLINGS,

*Acting Commissioner of Patents.*